(12) United States Patent
Chirdon

(10) Patent No.: US 10,316,229 B2
(45) Date of Patent: *Jun. 11, 2019

(54) PRODUCTION OF ADHESIVES AND OTHER GLUE-LIKE MATERIALS FROM BIOMASS DERIVED FROM WASTEWATER TREATMENT

(71) Applicant: University of Louisiana at Lafayette, Lafayette, LA (US)

(72) Inventor: William Chirdon, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,647

(22) Filed: Jun. 18, 2018

(65) Prior Publication Data

US 2018/0298256 A1 Oct. 18, 2018

Related U.S. Application Data

(63) Continuation of application No. 14/877,069, filed on Oct. 7, 2015, now Pat. No. 10,023,778.

(51) Int. Cl.
*C09J 189/04* (2006.01)

(52) U.S. Cl.
CPC .................. *C09J 189/04* (2013.01)

(58) Field of Classification Search
None
See application file for complete search history.

(56) References Cited

U.S. PATENT DOCUMENTS

2014/0261075 A1* 9/2014 Chirdon ................. C09J 189/04
106/124.1

* cited by examiner

*Primary Examiner* — Melvin C. Mayes
*Assistant Examiner* — Stefanie J Cohen
(74) *Attorney, Agent, or Firm* — Richard L. Vail; Russel O. Primeaux; Kean Miller LLP

(57) ABSTRACT

A system and method for treatment of biomass originating from wastewater treatment biosolids to obtain valuable adhesives and composite materials is described herein. Some embodiments do not require purification of a biomass product or residue to produce an adhesive. Some embodiments comprise a treatment of post extraction biomass residue configured to produce an adhesive. Use of post extraction biomass residue adds value to alternative energy produced by extracting oil from biomass.

5 Claims, 15 Drawing Sheets

PRODUCTION OF ADHESIVES AND OTHER GLUE-LIKE MATERIALS FROM BIOMASS DERIVED FROM WASTEWATER TREATMENT

CROSS REFERENCE TO RELATED APPLICATIONS

This application is a continuation of U.S. patent application Ser. No. 14/877,069 entitled "System and Method for Treatment of Biomass Products or Residues and Resulting Composition" filed Oct. 7, 2015, now U.S. Pat. No. 10,023,778, which claims priority to U.S. patent application Ser. No. 14/206,577 filed Mar. 12, 2014, which claims priority to the U.S. provisional application No. 61/777,921, filed on Mar. 12, 2013.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the system and method for treatment of biomass products or residues and resulting compositions, which may be embodied in various forms. It is to be understood that in some instances, various aspects of the invention may be shown exaggerated or enlarged to facilitate an understanding of the invention. Therefore the drawings may not be to scale.

DETAILED DESCRIPTION

Figure 1:
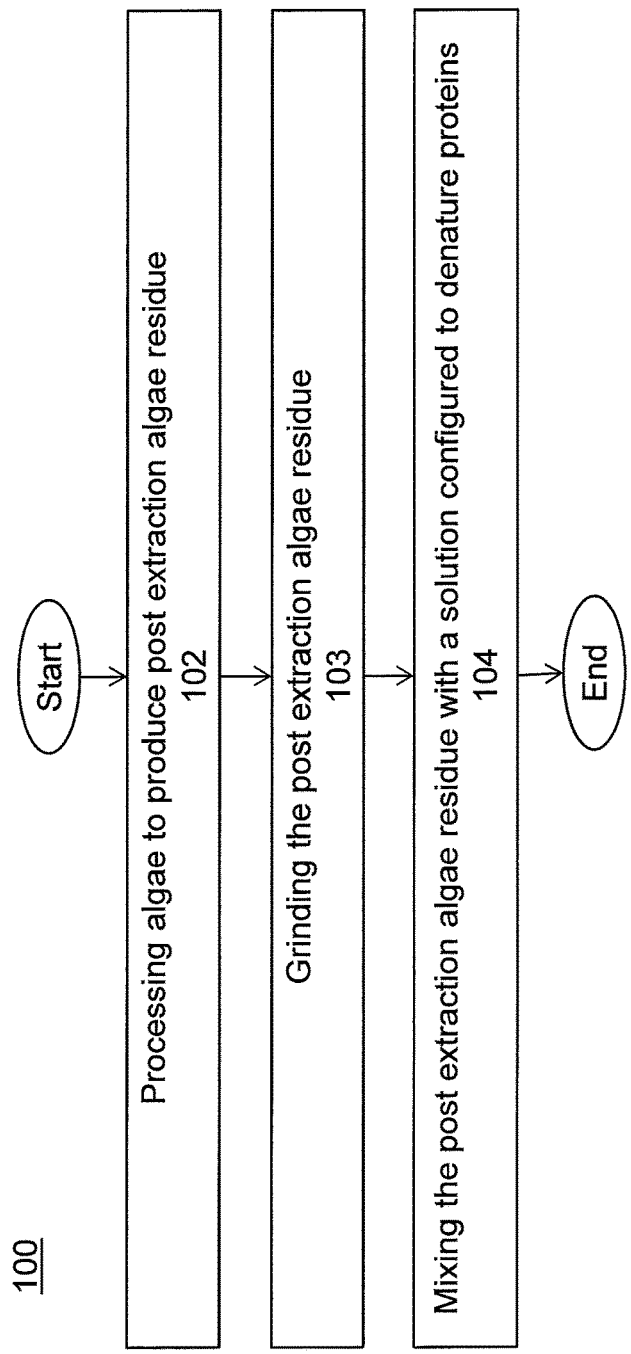
FIG. 1 illustrates an embodiment of a method of creating an adhesive.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of denaturant solutions, biomass, composite materials, and additives. One skilled in the relevant art will recognize, however, that the method for treatment of a product or byproduct of a process and the resulting composition may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment. Other steps and methods may be conceived that are equivalent in function, logic, or effect to one or more steps, or portions thereof, of the illustrated method for treatment of a product or byproduct of a process and the resulting composition. Additionally, the format and symbols employed are provided to explain the logical steps of the method for treatment of a product or byproduct of a process and the resulting composition and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Described herein is a system and method for treatment of a product or byproduct of a process and the resulting composition. In one embodiment, the system and method described herein comprises the creation of an adhesive from biomass. In another embodiment, the system and method described herein comprises the creation of an adhesive from post extraction algae residue. In another embodiment, the system and method described comprises the creation of an adhesive from any proteinaceous product or proteinaceous byproduct of any process. An example of a proteinaceous byproduct includes, but is not limited to, "post extraction algae residue." Post extraction algae residue is a byproduct from the process of extracting oil from algae for alternative energy production and other purposes. However, additional embodiments of the present invention may include treatment of any proteinaceous byproduct of a process or any product made intentionally for this treatment. Certain embodiments of the treated biomass can be used as an adhesive.

Conventional fuel sources include fossil fuels, such as petroleum, coal, and natural gas. Fossil fuels are associated with many disadvantages, including but not limited to: limited reserves; long regenerations time; emitting carbon dioxide when burned, which may contribute to global warming; emitting sulfur dioxide when burned, which contributes to acid rain; environmental hazards (e.g., oil spills) during transporting, drilling, producing, and refining crude oil; and health hazards (e.g., coal mine pollution) during removal or extraction of the fossil fuel.

In light of the many disadvantages of fossil fuels, many alternative energy sources have been developed, including but not limited to, solar power, wind power, hydropower, and geothermal power. There are many disadvantages associated with each of the above listed alternative energy sources. For example, solar power requires a large upfront cost and requires back-up sources of energy for times when no solar input is available. Wind power requires large wind turbines and only generates power when sufficient wind is present. Hydropower often requires building large, expensive dams that alter the natural environment around the dam. Geothermal power requires tapping hot spots accessible within the Earth's crust. However, these hot spots may be challenging to locate and often occur in unstable locations, such as near volcanoes or fault lines, which are subject to earthquakes.

Another alternative energy source is biofuel, including but not limited to biodiesel, prepared from animal fat or vegetable oil. Biodiesel is a fuel comprising long-chain alkyl (methyl, propyl, or ethyl) esters. Biodiesel may be mixed with other compounds. Biodiesel can be used as fuel for biodiesel engines in automobiles, trains, or aircraft, or as heating oil for domestic and commercial boilers. Alternative energy technologies that create liquid fuels, such as biodiesel, are particularly valuable because they allow the energy to be safely stored until needed. In contrast, gaseous fuels have higher risks associated with their use, transport, and storage.

There are some disadvantages associated with biodiesel when biodiesel is made from vegetable oil and/or animal fat. For example, animal fat is produced as a result of certain types of meat processing and cooking. However, the quantity of animal fat currently produced for food purposes is not sufficient to generate the quantities of animal fat-based biodiesel to keep up with energy consumption demands. Also, plants and animals needed to produce vegetable oil and animal fat for biodiesel compete with plants and animals used for human food. For example, the land on which corn, soybeans, or other plants used to create vegetable oil is a finite resource and only so much corn, soybean, and other plants can be grown on such land. According to general supply and demand principles, when food suppliers and biodiesel producers compete for the limited supplies of corn, soybeans, and other crops, the cost of such resources for both food and fuel purposes are driven up. The same issues arise when creating ethanol from food crops. Additionally, using food sources for biodiesel poses ethical implications because rising food prices may cause an increase in starvation rates, particularly in impoverished countries.

Another alternative energy source is algae. Certain types of algae may be used to produce a variety of biofuels, including but not limited to, biodiesel, bioethanol, biogasoline, biomethanol, biobutanol, and others. Algae can be grown without competing for land currently used for growing food crops, since algae can grow on land that is unsuitable for other crops or in ocean water, sewage, or wastewater. Another benefit of biofuel produced from algae is that algae are generally biodegradable. Additionally, many types of algae can be cultivated in a much shorter period of time, relative to crops that otherwise might be used for biofuel production. Accordingly, more algae can be grown at a faster rate than other crops that might be used for biofuel production.

A non-limiting list of places where algae may be cultivated includes an open pond, a vertical growth/closed loop system, a closed tank bioreactor, a fermentation system, or other environments. Many different types of algae, including macroalgae (e.g., seaweed) and microalgae, may be a substrate from which oil for biofuel may be extracted. Algae known to be capable of oil production include: *Ankistrodesmus* TR-87, *Bacilliarophy*, *Botryococcus braunii*, *Chlorella* sp., *Chlorella prototheocoides* (autotrophic/heterotrophic), *Chlorophyceae*, *Cyclotella* DI-35, *Crypthecodinium cohnii*, *Dunaliella tertiolecta*, *Euglena gracilis*, *Hantzschia* DI-160, *Isochrysis galbana*, *Nannochloris*, *Nannochloropsis salina*, *Neochloris oleoabundans*, *Nitzschia* TR-114, *Phaeodactylum tricornutum*, *Pleurochrysis carterae*, *Scenedesmus* TR-84, *Scenedesmus acuminatus*, *Scenedesmus dimorphus*, *Scenedesmus longispins*, *Schiochytrium*, *Stichococcus*, *Tetraselmis chui*, *Tetraselmis suecica*, and *Thalassiosira pseudonana*.

Byproducts derived from both phototrophic and heterotrophic algae strains have been shown to have similar shear strengths when converted to adhesives or glues. The method described herein can be performed using algal products or byproducts that may arise from biofuel production, wastewater treatment, food production, algae harvested from waterways (including but not limited to polluted waterways such as streams and lakes), algae cultured or harvested from wastewater, or other sources of algal products. Additionally, the method described herein can be performed directly without any pre-processing or pre-treatment required.

During cultivation of the algae, conditions may be optimized for proliferation. In some embodiments, environmental conditions that are intended to induce increased oil storage are provided to the algae.

Algae may be harvested and processed to extract certain lipids (which are referred to herein as "algae oil") for production of biofuels. In some embodiments, algae oil extraction methods comprise an oil press step, which comprises putting pressure on the harvested algae such that liquid extract, comprising algae oil, emerges from the mass of algae cells. In other embodiments, algae oil extraction methods may be chosen from the group consisting of: ultrasonic-assisted extraction, hexane solvent method, soxhlet extraction, supercritical fluid extraction, enzymatic extraction, osmotic shock, or any other method known in the art or discovered in the future. The liquid extract, which comprises algae oil, may then be processed to make biofuel. In one embodiment, the process performed on the liquid extract, which comprises algae oil, to make biofuel comprises transesterification. However, in another embodiment, no oil extraction is performed on the biomass, which comprises algae.

In another embodiment, the whole biomass is used and no separation of components from the biomass is required and the method does not yield additional products. In another embodiment, the biomass undergoes an extraction of oil or other components, including but not limited high-value components, prior to addition of the denaturant; however no further extractions or purifications are required.

The various methods of algae oil extraction may be classified into disruptive or non-disruptive. Disruptive methods of algae oil extraction comprise lysing cells by mechanical, thermal, enzymatic, or chemical methods. Most disruptive methods of algae oil extraction comprise emulsions and require an expensive cleanup process. Non-disruptive methods of algae oil extraction are typically less complex than disruptive methods, but the non-disruptive methods produce low yields of lipids or algae oil. Additionally, during algae oil extraction, particularly when using any of the disruptive methods, byproducts, such as post extraction algae residue, may be formed.

Both disruptive and non-disruptive methods of algae oil extraction, or the extraction of any other component or residue from the algae, produce a byproduct from the components of the harvested algae that remain after removing the liquid extract (the byproduct that remains after the removal of the liquid extract is referred to herein as "algae cake," "post extraction algae residue," or "PEAR"). PEAR, can arise from other extraction processes other than those discussed herein. The use of the term "PEAR" includes PEAR generated by any extraction process, whether now known or later discovered. Further, as used herein, the term "PEAR" includes the residue from any extraction from algal biomass; PEAR could be extraction of lipids or any other components, including but not limited to high-value components that are used for food and/or nutraceuticals.

Purification and/or enrichment processes may be necessary to convert a biomass, including but not limited to PEAR, or similar biowaste material, including but not limited to forest product waste (such as chips, sawdust, etc.), bioprocessing byproducts (other byproducts of processing that result in a protein containing "cake"), fibrous agricultural byproducts (such as bagasse, and corn), algal biomasses that are wastes (such as those arising from wastewater treatment, from municipal waste, agricultural runoff, or aquacultural runoff), microbial biomasses (including, but not limited to, yeast and bacteria), into a residue that has adhesive properties. As used herein, the term "biomass" includes, but is not limited to, PEAR, biowaste materials, and other similar biomaterial. Purification and/or enrichment processes that may be used to convert biomass into a residue that has adhesive properties, include but are not limited to, fermenting biomass material into a residue, liquefaction of lignin-bearing plant material to derive oil, and phenolic fraction extraction. The adhesive that results from the method described herein is produced from sustainable, renewable sources and are completely formaldehyde-free.

A disadvantage of using algae to create biofuels is that certain steps in the cultivation, harvesting, and processing of algae are expensive. To add value to the process, efforts have been made to identify commercial uses for PEAR, including burning the PEAR for fuel, preparing the PEAR for use as soil fertilizer, or compounding the PEAR into animal feed. However, the above listed uses have limited commercial value.

In one embodiment, the system and method described herein comprise manufacturing an adhesive derived from biomass. In one embodiment, the biomass comprises PEAR. In another embodiment, the system and method comprises manufacturing an adhesive from a biomaterial similar to the PEAR. In still another embodiment, the system and method comprise the conversion of biomass, resulting from the treatment of wastewater or other organic wastes, into marketable products, including, but not limited to, adhesives or composites. In still another embodiment, the method utilizes the whole biomass and does not require separation of components from the biomass. In still another embodiment, the method comprises manufacturing an adhesive derived from algae, wherein oil is not extracted from the algae.

In one embodiment, the system and method for creating an adhesive comprises obtaining PEAR. In one embodiment, the PEAR is obtained by cultivating algae in the environment, harvesting the algae from the environment, and extracting algae oil from the algae, thereby generating a byproduct of PEAR. In another embodiment, the PEAR is obtained from algal products or byproducts that may arise from biofuel production, wastewater treatment, food production, algae harvested from waterways (including but not limited to polluted waterways such as streams and lakes), algae cultured or harvested from wastewater, or other sources of algal products. In some embodiments, the PEAR is obtained from an open pond, a vertical growth/closed loop system, a closed tank bioreactor, or a fermentation system. In some embodiments, PEAR comprises proteins, carbohydrates, small amounts of deoxyribonucleic acid ("DNA"), and other cellular components.

Any type of algae may be used to obtain the PEAR, including, but not limited to: *Ankistrodesmus* TR-87, *Bacilliarophy*, *Botryococcus braunii*, *Chlorella* sp., *Chlorella prototheocoides* (autotrophic/heterotrophic), *Chlorophyceae*, *Cyclotella* DI-35, *Crypthecodinium cohnii*, *Dunaliella tertiolecta*, *Euglena gracilis*, *Hantzschia* DI-160, *Isochrysis galbana*, *Nannochloris*, *Nannochloropsis salina*, *Neochloris oleoabundans*, *Nitzschia* TR-114, *Phaeodactylum tricornutum*, *Pleurochrysis carterae*, *Scenedesmus* TR-84, *Scenedesmus acuminatus*, *Scenedesmus dimorphus*, *Scenedesmus longispins*, *Schiochytrium*, *Stichococcus*, *Tetraselmis chui*, *Tetraselmis suecica*, and *Thalassiosira pseudonana*. The algae used to create PEAR may be any naturally occurring algae or genetically modified algae that is known in the art or that may be discovered in the future. In one embodiment, the algae from which the PEAR is created comprises at least one or more of the following qualities: high algae oil content, rapid proliferation, simple to harvest, easy extraction of algae oil, low cost nutrients, permits human/artificial control of grown and development, and/or minimal maintenance. In another embodiment, the algae from which the PEAR is obtained may be specially adapted for a specific environment, including but not limited to, an open pond, a vertical growth/closed loop system, a closed tank bioreactor, a fermentation system, or any other artificial or natural environment.

Particle size is an important factor in the creation of effective adhesives. Smaller particle sizes are easier to disperse and result in stronger glues or adhesives. If a biomass, including but not limited to PEAR, does not have a fine particle size (especially if it has been dried and compacted for storage), the size can be reduced using a common, commercially available grinder. In one embodiment, the biomass is ground into a small sized ("fine") flour to improve the consistency and homogeneity of the biomass. In a further embodiment, the biomass is ground so that it can pass through a 100 mesh sieve. Grinding the biomass also may permit faster and more complete denaturization reactions. In alternate embodiments, the biomass is not ground.

Dispersing the biomass in water before denaturing leads to better dispersion and a better adhesive because the resultant adhesive from the denaturization process inhibits further dispersion and denaturation. In some embodiments where the biomass is ground, the ground biomass is wetted with water. However, in alternate embodiments, the ground biomass is not wetted.

The biomass, whether ground or un-ground, is mixed with a denaturant solution, which is a solution that will denature proteins in the biomass, to create an adhesive mixture. The denaturant solution may comprise a urea or alkaline solution. In one embodiment, the denaturant solution comprises an alkaline solution. In a further embodiment, the alkaline denaturant solution comprises urea. In another embodiment, the denaturant solution comprises an acid. In another embodiment, the denaturant solution comprises a surfactant. In a further embodiment, the denaturant solution comprises a surfactant and the surfactant comprises SDS. The denaturing step of the method described herein can take place at any temperature where there is a liquid solution. In one embodiment, the temperature for the denaturing step is between approximately −5° C. and approximately 300° C. In one embodiment, the temperature for the denaturing step of the method is between approximately 20° C. and approximately 70° C. In one embodiment, the time during which the biomass is treated with the denaturant solution is between approximately 0 minutes to approximately 3 hours. In a further embodiment, the biomass comprises PEAR and the biomass is treated with the denaturant solution between approximately 0 minutes and approximately 3 hours. In another embodiment, the time during which the biomass is treated with the denaturant solution is between approximately 1 minute and approximately 29 minutes. In a further embodiment, the biomass comprises PEAR and the biomass is treated with the denaturant solution between approximately 1 minute and approximately 29 minutes. In still another embodiment, the time during which the biomass is treated with the denaturant solution is between approximately 30 minutes and approximately 3 hours. In a further embodiment, the biomass comprises PEAR and the biomass is treated with the denaturant solution between approximately 30 minutes and approximately 3 hours. In other embodiments, the temperature treatment step is performed at ambient temperature. In another embodiment, the time for the temperature step is between approximately 0 seconds and approximately 10 seconds.

Generally, if the biomass and denaturant solution mixture is treated at a higher temperature, the optimized treatment time may be shorter. Accordingly, if the biomass and denaturant solution mixture is treated at a lower temperature, the optimized treatment time may be longer. In some embodiments, the biomass-denaturant mixture may be maintained at approximately room temperature (e.g., approximately 20° C. to approximately 25° C.) at all times. In a further embodiment, the biomass comprises PEAR and the biomass-denaturant mixture may be maintained at approximately room temperature (e.g., approximately 20° C. to approximately 25° C.) at all times. In other embodiments, the biomass-denaturant mixture may be subjected to a temperature between approximately 26° C. and approximately 70° C. for a duration of between approximately 0 minutes and approximately 3 hours. In a further embodiment, the biomass comprises PEAR and the biomass-denaturant mixture may be subjected to a temperature between approximately 26° C. and approximately 70° C. for a duration of between approximately 0 minutes and approximately 3 hours. In another embodiment, the biomass-denaturant mixture is subjected to a temperature between approximately 26° C. and 70° C. for a duration of between approximately 1 minute and approximately 29 minutes. In a further embodiment, the biomass comprises PEAR and the biomass-denaturant mixture is subjected to a temperature between approximately 26° C. and 70° C. for a duration of between approximately 1 minute and approximately 29 minutes. In yet another embodiment, the biomass-denaturant mixture is subjected to a temperature between approximately 26° C. and 70° C. for a duration of between approximately 30 minutes and approximately 3 hours. In a further embodiment, the biomass comprises PEAR and the biomass-denaturant mixture is subjected to a temperature between approximately 26° C. and 70° C. for a duration of between approximately 30 minutes and approximately 3 hours.

The denaturant solution may comprise an acidic solution (approximately pH<7), a basic (alkaline) solution (approximately pH>7), or a neutral solution (approximately pH 7). In some embodiments, the denaturant solution comprises a surfactant with a pH around approximately 7. In some embodiments, the denaturant solution comprises an alkaline solution with a pH between approximately 10 and approximately 14. The use of an alkaline denaturant solution minimizes corrosion and other safety hazards. In embodiments that comprise an alkaline denaturant solution, the alkaline denaturant solution may comprise a strong base or a weak base. Examples of strong bases that may comprise the alkaline denaturant solution include, but are not limited to sodium hydroxide or potassium hydroxide. Examples of weak bases that can comprise the alkaline denaturant solution include, but are not limited to: ammonia, calcium hydroxide, or borax. In some embodiments, the denaturant solution comprises an alkaline denaturant solution, which comprises urea. In other embodiments, the denaturant solution comprises an alkaline denaturant solution, which comprises monosodium phosphate. In one embodiment, the denaturant solution comprises an alkaline solution which comprises up to approximately 1 mole/L sodium hydroxide solution. In another embodiment, the denaturant solution comprises an alkaline solution which comprises up to approximately 1 mole/L of potassium hydroxide solution.

The level of denaturation of the proteins in the PEAR-denaturant mixture may be altered by changing the temperature, the treatment time, and/or the concentration of the constituents of the denaturant solution.

In some embodiments, after combining the biomass and denaturant solution, the resulting mixture is treated to remove any insoluble solids, which yields an adhesive with increased transparency. In a further embodiment, the biomass-denaturant solution mixture is filtered. In another embodiment, the biomass-denaturant solution is centrifuged. In still another embodiment, the biomass-denaturant solution is separated by any other removal method known in the art or later discovered. In some embodiments where the biomass-denaturant solution is filtered, a relatively fine filter may be used to obtain a more transparent mixture. In an alternative embodiment where the biomass-denaturant solution is filtered, a coarser filter can be used to obtain a higher yield, but with decreased transparency. In some embodiments where the biomass-denaturant solution is centrifuged, a longer centrifugation time may be used to obtain a more transparent mixture. In an alternative embodiment where the biomass-denaturant solution is centrifuged, a shorter centrifugation time may be used to obtain a higher yield, but with decreased transparency.

Figure 11:
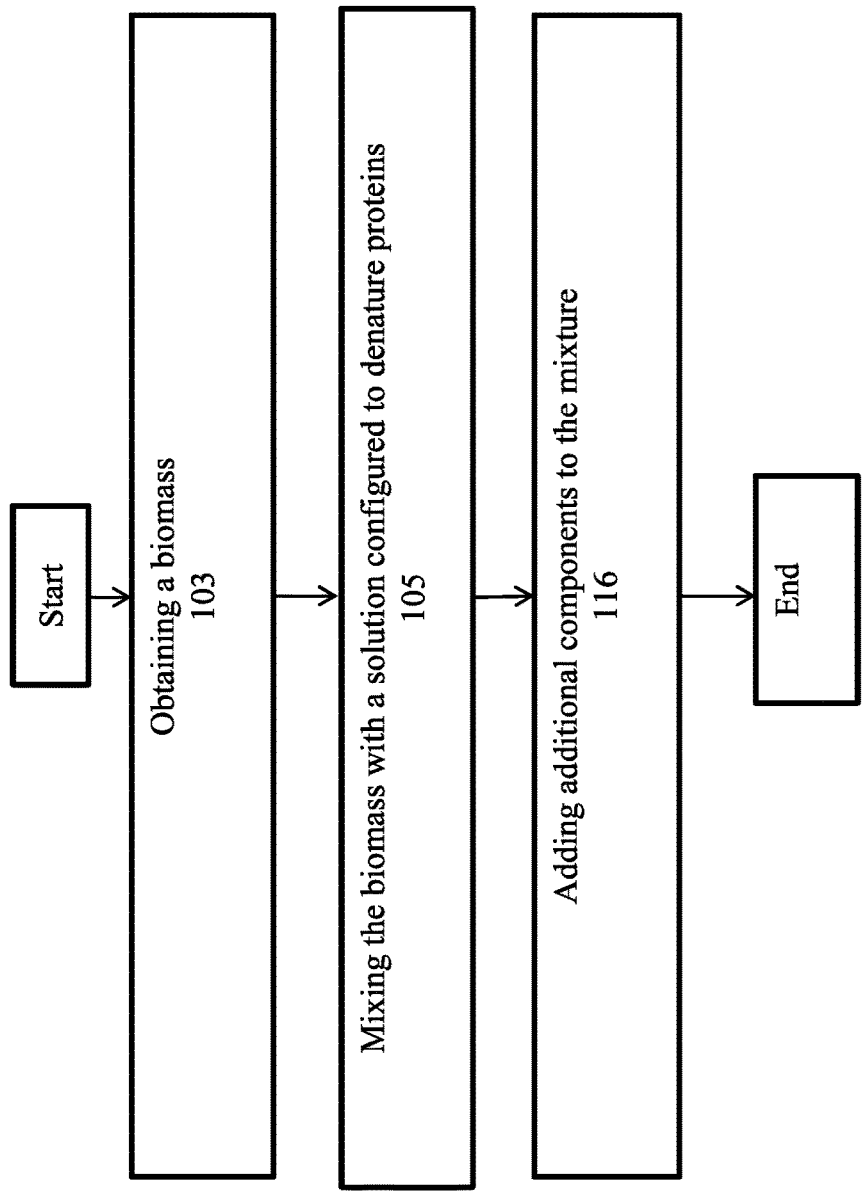
FIG. 11 illustrates an embodiment of a method of creating an adhesive.

In some embodiments, the biomass-denaturant solution comprises additional components, as shown in FIG. 11. Additional components which may be added to the biomass-denaturant solution include, but are not limited to, components comprising a second adhesive, a glue, a preservative, a cross-linker, aliphatic epoxy resin, a defoamer, or sodium silicate.

In some embodiments of the method, the biomass-denaturant mixture results in a first adhesive mixture and the first adhesive mixture is blended with a second adhesive mixture. In another embodiment of the method, the biomass-denaturant mixture results in a first adhesive mixture and the first adhesive mixture is blended with a glue. The glue may comprise conventional synthetic glues, such as epoxy-based or formaldehyde-based resins, or natural glues derived from animal blood, casein, soybean, or soybean flour. Formaldehyde-based resin may improve the mechanical properties and durability of the blended first adhesive and second adhesive mixture. Due to the thermosetting properties of animal blood, the use of natural glues derived from animal blood in the second adhesive mixture permits improved water resistance of the blended first adhesive mixture and second adhesive mixture. The use of natural glues derived from casein in the second adhesive mixture permits improved water resistance of the blended first adhesive mixture and second adhesive mixture. The use of natural glues derived from soybean or soybean flour in the second adhesive mixture may increase the quantity of the resulting blended first adhesive mixture and second adhesive mixture. In one embodiment, the first adhesive mixture is blended with a glue comprising an epoxy based resin. In another embodiment, the first adhesive mixture is blended with a glue mixture comprising a formaldehyde-based resin. In still another embodiment, the first adhesive mixture is blended with a glue comprising a natural glue derived from animal blood. In another embodiment, the first adhesive mixture is blended with a glue comprising a natural glue derived from casein. In yet another embodiment, the first adhesive mixture is blended with a glue comprising a natural glue derived from soybean flour.

Some preservatives are configured to provide mold resistance. In some embodiments, the biomass-denaturant mixture is combined with a preservative. Examples of preservatives that can be combined with the biomass-denaturant mixture include, but are not limited to, copper-8-quinolinolate, copper naphthenate, chlorinated phenol, or orthophenyl phenol. In one embodiment, the biomass comprises PEAR and the biomass-denaturant mixture is combined with a preservative comprising copper-8-quinolinolate. In another embodiment, the biomass comprises PEAR and the biomass-denaturant mixture is combined with a preservative comprising copper naphthenate. In still another embodiment, the biomass comprises PEAR and the biomass-denaturant mixture is combined with a preservative comprising chlorinated phenol. In yet another embodiment, the biomass comprises PEAR and the biomass-denaturant mixture is combined with a preservative comprising orthophenyl phenol.

Cross-linkers are components configured to link one polymer chain (e.g., protein chain, other natural polymer, or synthetic polymer) to another. Examples of methods of linking the polymer chains include, but are not limited to, linkage via a covalent bond or an ionic bond. In some embodiments, cross-linkers are added to the biomass-denaturant mixture. In one embodiment, the cross-linker that is added is at an approximately 0.1% to approximately 1% concentration. In one embodiment, the cross-linker comprises a formaldehyde donor, sulfur compound, or an inorganic complexing salt. In another embodiment, the cross-linker, which is added to the biomass-denaturant mixture, is configured to improve water resistance. Examples of cross-linkers that are configured to improve water resistance include, but are not limited to, cross-linkers comprising dialdehyde starch, dimethylol urea, sodium formaldehyde bisulfite, or hexamethylenetetramine. In another embodiment, the cross-linker, which is added to the biomass-denaturant mixture, is configured to improve the working properties and adhesive performance of the biomass-denaturant mixture. In one embodiment, the cross-linker, which is added to improve the working properties or adhesive performance, comprises carbon disulfide, thiourea, ethylene trithiocarbonate, soluble salts of cobalt, chromium, or copper.

Figure 12:
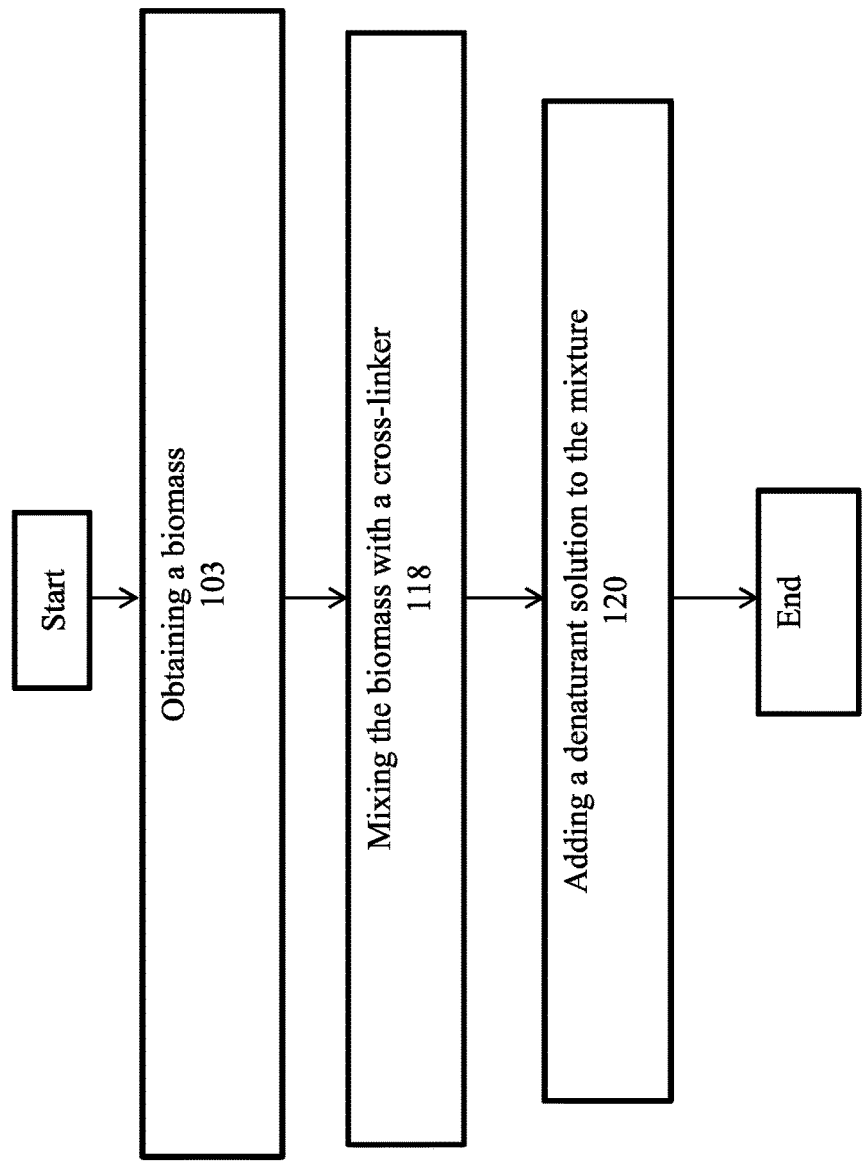
FIG. 12 illustrates an embodiment of a method of creating an adhesive.

In one embodiment, cross-linkers are added to the biomass before the addition of the denaturant, as shown in FIG. 12. In an alternative embodiment, the cross-linkers are added to the biomass-denaturant mixture immediately after the addition of the denaturant. In still another alternate embodiment, biomass is mixed with denaturant under a first set of reaction conditions and then the cross-linker is added to the biomass-denaturant mixture under a second set of reaction conditions that are different from the first set of reaction conditions.

In another embodiment, an aliphatic epoxy resin is added to the biomass-denaturant mixture to generate a protein-epoxy copolymer. In one embodiment, the aliphatic epoxy resin is added to the biomass-denaturant mixture and the aliphatic epoxy resin that is added is approximately 5% to approximately 20% of the weight of the biomass in the biomass-denaturant mixture. In one embodiment, the biomass comprises PEAR, the PEAR is ground, and the amount of aliphatic epoxy resin is added is approximately 5% to approximately 20% of the weight of the ground PEAR that comprises the biomass-denaturant mixture.

In some embodiments, a defoamer is added to the biomass-denaturant mixture. In some further embodiments, the defoamer is configured to reduce or hinder foam in the mixture. In one embodiment, the defoamer comprises an oil-based defoamer.

In some embodiments, the biomass comprises PEAR and sodium silicate is added to the biomass-denaturant mixture to help maintain a level viscosity for longer adhesive working life and to improve water resistance by forming insoluble proteinates.

In some embodiments, no modification or purification to a residue derived from a biomass is necessary for the residue to be used for creating an adhesive.

In some embodiments, no additional enrichment, meaning the addition of additives or modifiers, is necessary to modify the biomaterial converted into residue that may be used for creating an adhesive.

In some embodiments, the biomass comprises PEAR and the method comprises utilizing separation to extract components from the biomass-denaturant mixture that may be valuable or useful for other processes or applications.

In other embodiments, biomass comprises PEAR and the method comprises utilizing separation to modify the biomass-denaturant mixture to improve the properties of the product. Non-limiting examples of modifications that may be made to the biomass-denaturant mixture are the mass fraction of the protein may be enhanced or components with a deleterious effect on the resultant mechanical properties may be removed. In one embodiment, the biomass comprises PEAR and the method comprises a separation step, performed on the biomass-denaturant mixture, which results in the mass fraction of the protein being enhanced in the biomass-denaturant mixture. In another embodiment, biomass comprises PEAR and the method comprises a separation step, performed on the biomass-denaturant mixture, which results in the removal of at least one component that has a deleterious effect on the resultant mechanical properties of the biomass-denaturant mixture.

The resulting product of the biomass-denaturant mixture is an adhesive (and is referred to herein as the "adhesive"). The adhesive may be used as a binder for a composite material or materials, which include, but are not limited to, the following raw materials: a wood product, rocks, sand, asphalt, gravel, recycled paper, oyster shell, corn stalk, chicken feather, rice husk, natural fiber, animal feed, pet feed, yard waste, agricultural wastes, or other filler materials. The adhesive can also be used as a binder in particleboard manufacturing. The adhesive may be applied to bind one or more composite materials. Examples of methods that may be used to apply the adhesive include, but are not limited to: by spray, curtain coater, knife, brush, indirect roller, spreader, roller, extrusion, and any other method that is known or later discovered.

In some embodiments, the biomass comprises materials other than PEAR and the biomass is used to create a residue that comprises adhesive characteristics. Examples of materials that the biomass may comprise, besides PEAR, include, but are not limited to, algal or microbial products resulting from $CO_2$ sequestration, algal or microbial products resulting from the treatment of wastewater or other organic wastes, or biomasses that have been cultivated for this purpose.

In one embodiment, the method for treatment of biomass products or residues adds value to a method for creating alternative energy. In one embodiment, the method comprises treating a biomass to form a product, where the biomass comprises algal products or byproducts that may arise from biofuel production, wastewater treatment, food production, algae harvested from waterways (including but not limited to polluted waterways such as streams and lakes), algae cultured or harvested from wastewater, or other sources of algal products. In yet another embodiment, the biomass is grown for the production of adhesive according to the method described herein. In a further embodiment, the biomass does not undergo any extraction for the removal of any components, and is therefore used in its entirety, and a denaturant solution is added to said biomass to form an adhesive. In another embodiment, a commercial use is identified for PEAR. In yet another embodiment, there is no requirement for an expensive process of protein isolation and purification for use of the PEAR. In another embodiment, the method comprises a simple process for producing an adhesive. In still another embodiment, the method's resulting product comprises a formaldehyde-free adhesive. In yet another embodiment, the product of the method comprises an adhesive that is free of Volatile Organic Compounds (VOCs). In another embodiment, the method's resulting product is an adhesive that is produced without using phenols. In another embodiment, the method's product comprises an adhesive that can be mixed with cross-linkers that are configured to improve the qualities and/or quantity of the adhesive mixture. In one embodiment, the method comprises production of a strong adhesive. In one embodiment, the method comprises production of a flexible adhesive. In another embodiment, the method comprises production of a transparent adhesive. In another embodiment, the method comprises production of a nearly-transparent adhesive. In one embodiment, the method comprises the production of a durable adhesive. In one embodiment, the method comprises the production of a mold-resistant adhesive. In one embodiment, the method comprises the production of a water-resistant adhesive.

Figure 2:
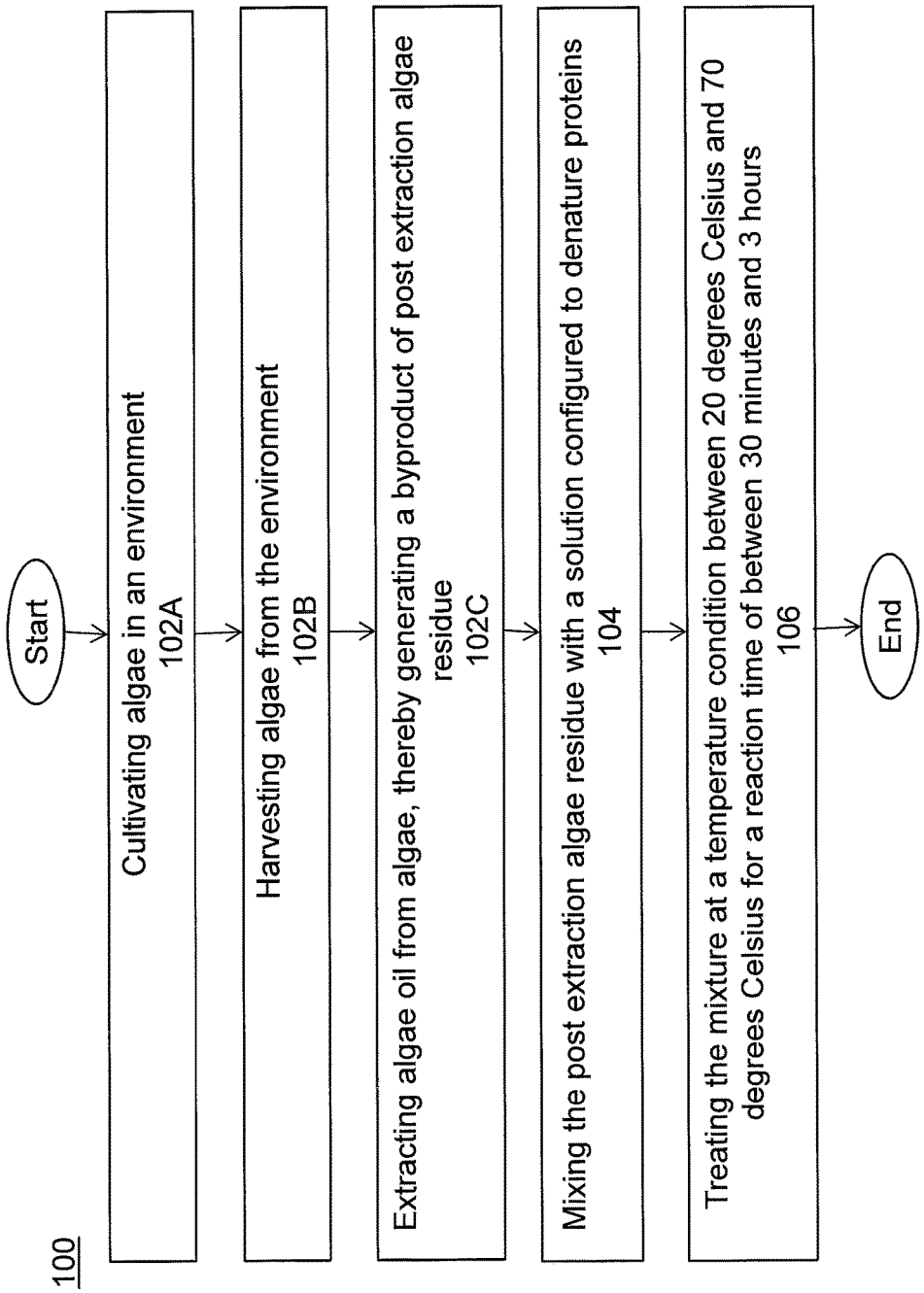
FIG. 2 illustrates an embodiment of a method of creating an adhesive.
Figure 3:
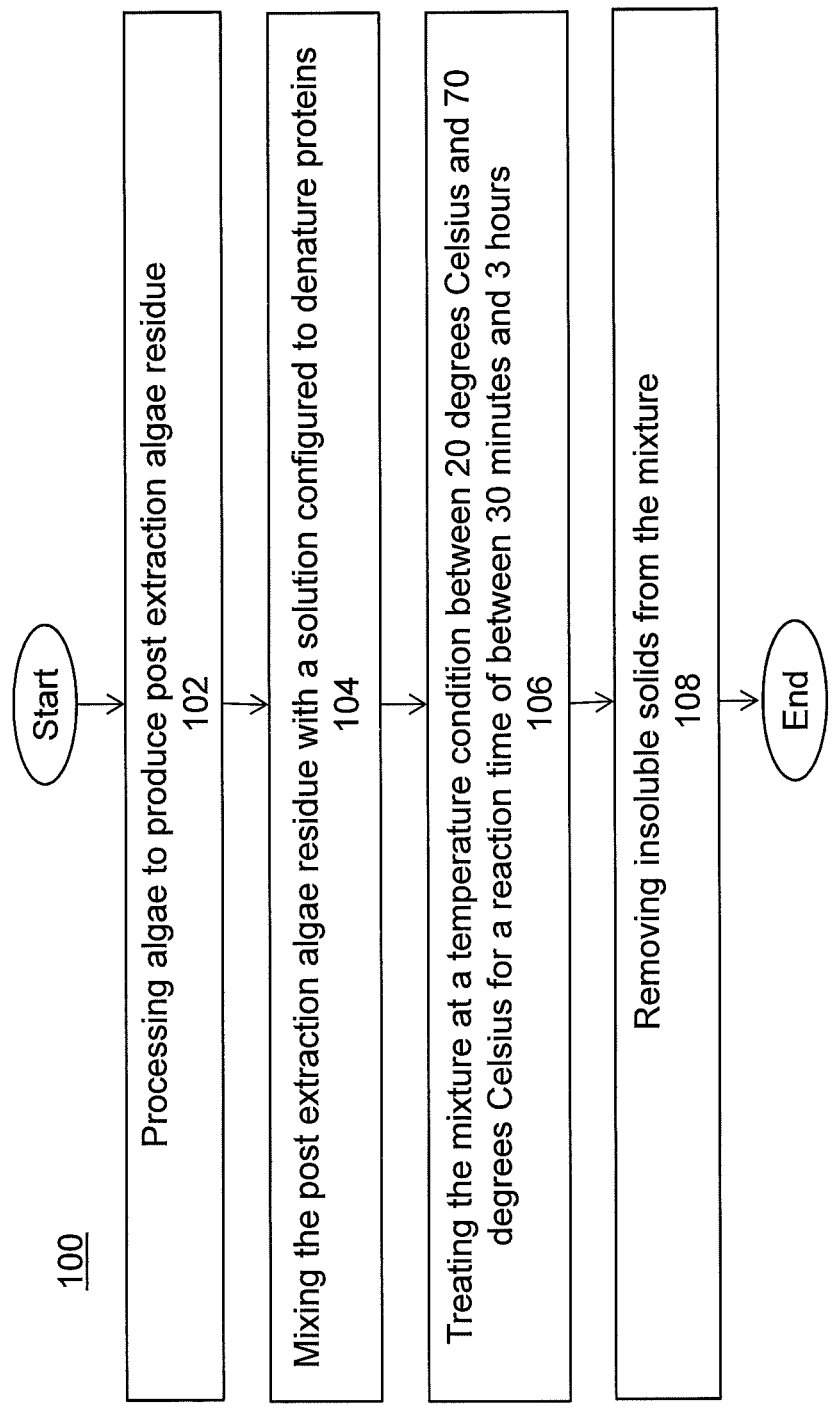
FIG. 3 illustrates an embodiment of a method of creating an adhesive.

FIG. 1 illustrates one of the embodiments of a method comprising the creation of an adhesive. In one embodiment of the method, method 100 comprises processing algae to produce PEAR 102, as shown in FIG. 1. In one embodiment, the method for obtaining PEAR comprises cultivating algae in an environment 102A, harvesting algae from the environment 102B, and extracting algae oil from algae, thereby generating a byproduct of PEAR 102C, as illustrated in FIG. 2.

In one embodiment, the PEAR is ground into a fine flour to improve the consistency and homogeneity of the PEAR 103. Grinding the PEAR may permit faster and more complete denaturization reactions.

In one embodiment, the ground PEAR is mixed with a solution that is configured to denature proteins in the PEAR (herein, referred to as a "denaturant") to create a PEAR-denaturant mixture 104. While the method may take place at any temperature, in some embodiments, the PEAR-denaturant mixture may be treated at a temperature condition of any temperature between 20° C. and 70° C. for a treatment of time of between approximately 0 minutes and approximately 3 hours, as shown in 106 in FIG. 2.

Generally, in embodiments where the PEAR-denaturant mixture is treated at a higher temperature, the treatment time may be lower than in embodiments where the PEAR-denaturant mixture is treated at a lower temperature. In some embodiments, biomass comprises PEAR and the method comprises maintaining the biomass-denaturant mixture at room temperature (e.g., approximately 20° C. to approximately 25° C.) at all times. In other embodiments, the biomass comprises PEAR and the method comprises treating the biomass-denaturant mixture at a temperature condition of between approximately 26° C. and approximately 70° C. In some embodiments, the biomass comprises PEAR and the method comprises configuring the temperature condition for the biomass-denaturant mixture to be one target temperature, selected from the range between approximately 26° C. and approximately 70° C., for the entire treatment time. In other embodiments, the biomass comprises PEAR and the method comprises configuring the temperature condition for the biomass-denaturant mixture to be within approximately 2° C., plus or minus, of a target temperature, selected from the range between approximately 26° C. and approximately 70° C., for the entire treatment time. In still other embodiments, the biomass comprises PEAR and the method comprises configuring the treatment condition for the biomass-denaturant mixture to be any temperature between approximately 20° C. and approximately 70° C., for at least part, but not all, of the treatment time.

In some embodiments, the method comprises adapting the level of denaturation of proteins by modifying at least one of the following: the temperature condition, the treatment time, and/or the concentration of the denaturant.

In some embodiments, the method comprises treating the biomass-denaturant mixture to remove any insoluble solids, which yields an adhesive with increased transparency. Methods 108 for treating the biomass-denaturant mixture to remove insoluble solids, include, but are not limited to, filtration, centrifugation, or any other removal method known in the art or that is later discovered. In one embodiment, the biomass comprises PEAR and the method comprises filtering the biomass-denaturant mixture. In one embodiment, the biomass comprises PEAR and the method comprises centrifuging the biomass-denaturant mixture.

Figure 4:
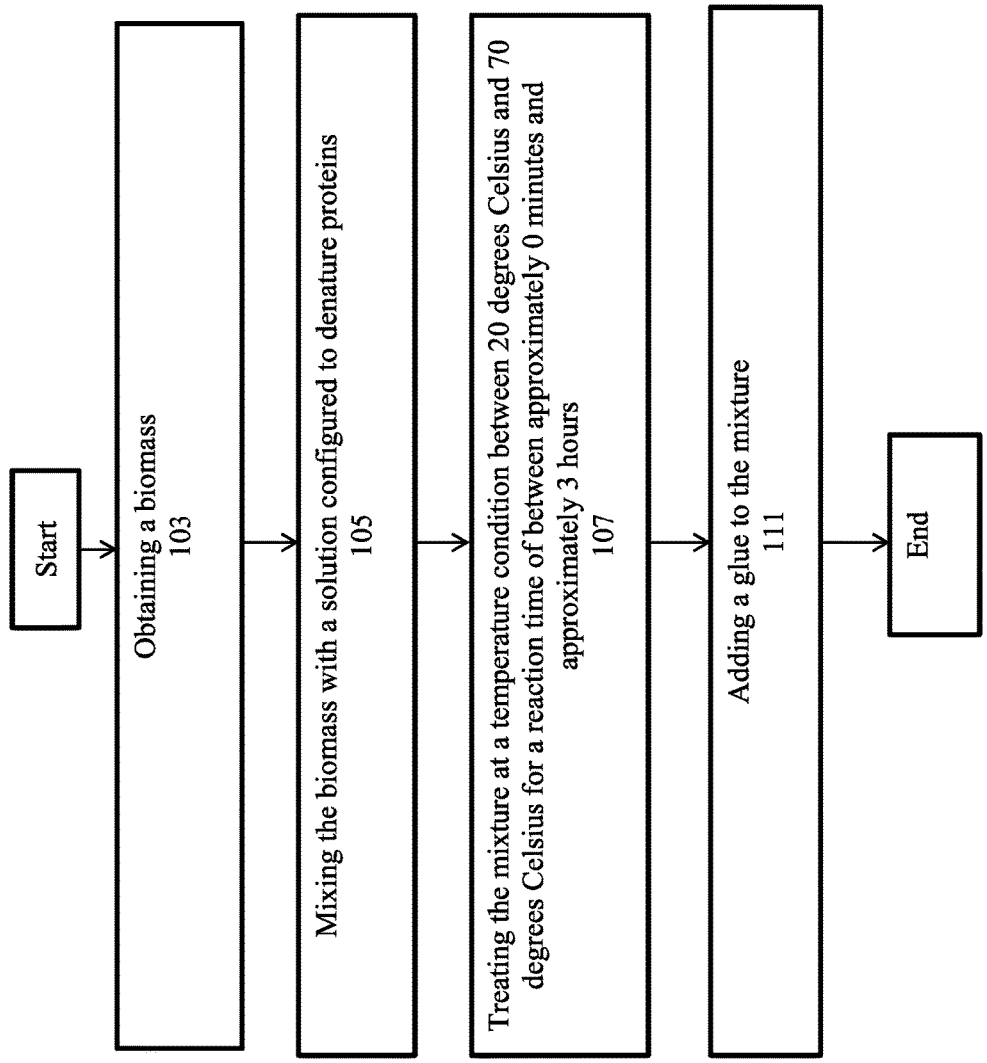
FIG. 4 illustrates an embodiment of a method for creating an adhesive.

In some embodiments, the method comprises blending the biomass-denaturant mixture with other adhesives (any other adhesive other than those created by using the process disclosed herein are referred to herein as "glues"). As shown in FIG. 4, when the biomass comprises PEAR, other adhesives 110 that may be blended with the biomass-denaturant mixture include, but are not limited to, glues such as epoxy-based or formaldehyde-based resins, natural glues derived from animal blood, casein, or soybean flour. Formaldehyde-based resins may improve the mechanical properties and durability of the adhesive mixture. Natural glues derived from animal blood permits improved water resistance of the adhesive due to the thermosetting properties of the animal blood. Natural glues derived from casein permit improved water resistance of the adhesive. When the biomass comprises PEAR, natural glues derived from soybean products may increase the quantity of the biomass-denaturant adhesive mixture. In one embodiment, the biomass comprises PEAR and the method comprises blending the biomass-denaturant mixture with an epoxy-based resin. In one embodiment, the biomass comprises PEAR and the method comprises blending the biomass-denaturant mixture with a formaldehyde-based resin. In an embodiment, the biomass comprises PEAR and the mixture comprises blending the biomass-denaturant mixture with a natural glue derived from animal blood. In an embodiment, the biomass comprises PEAR and the method comprises blending the biomass-denaturant mixture with a natural glue derived from casein. In one embodiment, the biomass comprises PEAR and the method comprises blending the biomass-denaturant mixture with a natural glue derived from soybean flour.

Figure 5:
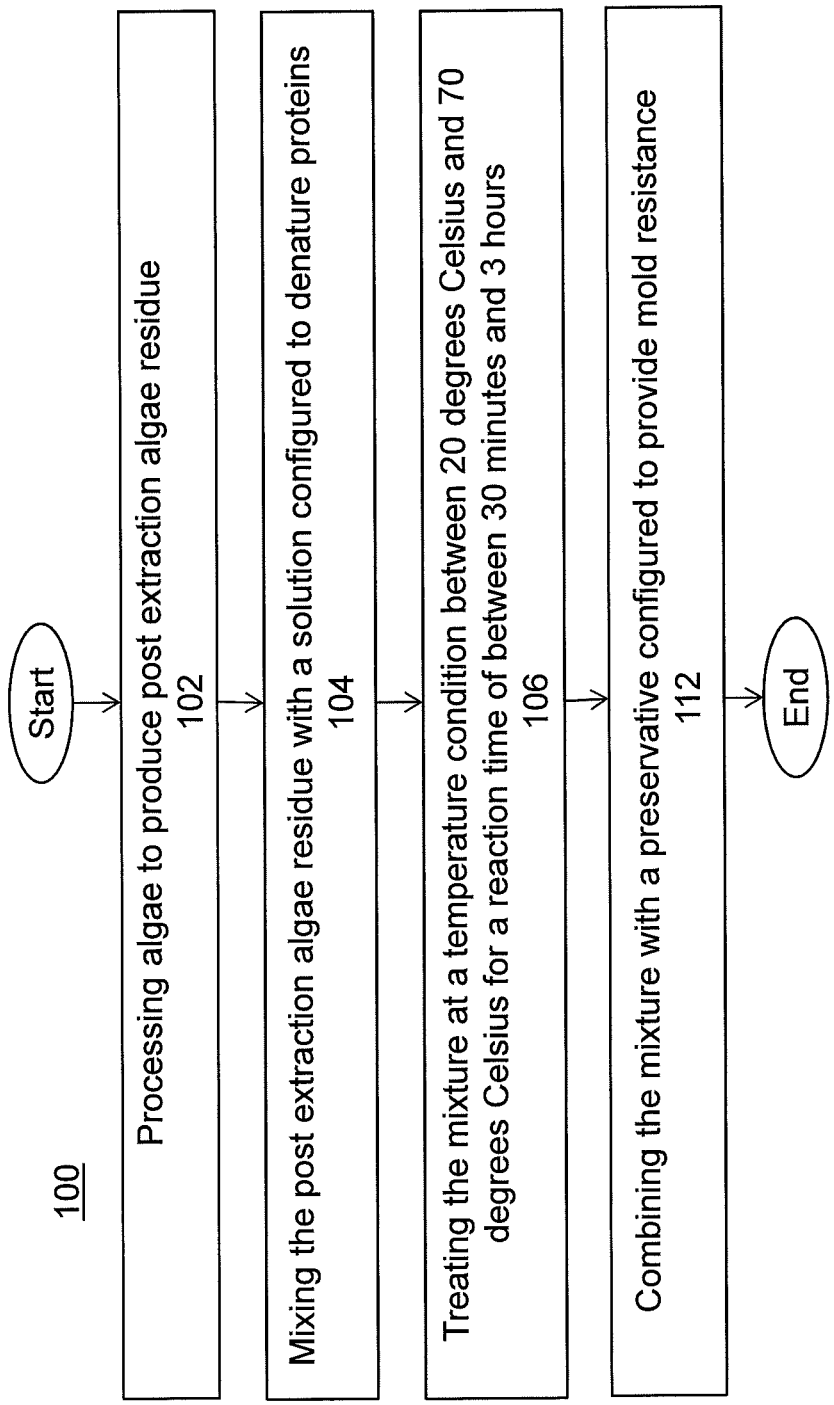
FIG. 5 illustrates an embodiment of a method of creating an adhesive.

As illustrated in FIG. 5, in one embodiment, the biomass comprises PEAR and the method comprises combining the biomass-denaturant mixture with a preservative 112. Some preservatives are configured to provide mold resistance. Preservatives that may be combined with the biomass-denaturant mixture include, but are not limited to, preservatives comprising copper-8-quinoinolate, preservatives comprising copper naphthenate, preservatives comprising chlorinated phenol, and/or preservatives comprising orthophenyl phenol. In one embodiment, the biomass comprises PEAR and the method comprises combining a preservative comprising copper-8-quinoinolate with the biomass-denaturant mixture. In an embodiment, the biomass comprises PEAR and the method comprises combining a preservative comprising copper naphthenate with the biomass-denaturant mixture. In an embodiment, the biomass comprises PEAR and the method comprises combining a preservative comprising chlorinated phenol with the biomass-denaturant mixture. In one embodiment, the biomass comprises PEAR and the method comprises combining a preservative comprising orthophenyl phenol with the biomass-denaturant mixture.

Figure 6:
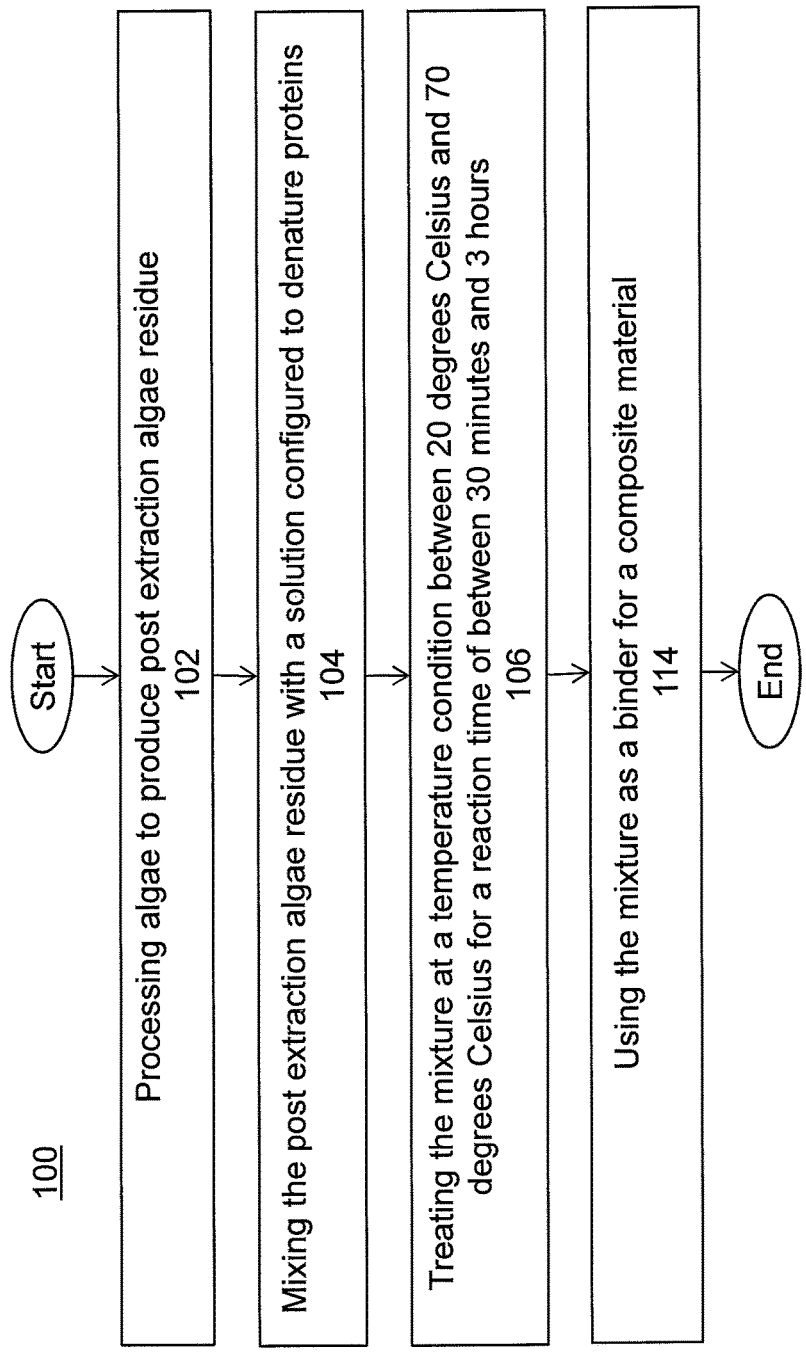
FIG. 6 illustrates an embodiment of a method of creating and using an adhesive.

In one embodiment, the method comprises adding a composite material to the adhesive, to create a composite mixture. In one embodiment, the method comprises using the resulting adhesive mixture as a binder for a composite material 114, as illustrated in FIG. 6, to produce a composite. Examples of composite material include, but are not limited to, at least one of the following raw materials: a wood product, rocks, sand, asphalt, recycled paper, oyster shell, corn stalk, chicken feather, rice husk, natural fiber, animal feed, pet feed, or other filler materials, whether currently known or later discovered. In one embodiment, the method comprises using the resulting composite mixture to produce a composite comprising at least one of the following: a wood product, rocks, sand, asphalt, recycled paper, oyster shell, corn stalk, chicken feather, rice husk, natural fiber, animal feed, pet feed, or other filler materials, whether currently known or later discovered.

One inherent difficulty with making adhesives and composites with this method is that the adhesive hardens and solidifies by drying or evaporation. This is done by applying heat to speed the drying/evaporation process and by applying pressure in a mold to make the composite more dense, to create stronger adhesion within the composite, and to create the desired shape. However, when water is heated and pressurized within the mold, the water will boil and can cause bubbles or cracks that reduce the strength as well as having the potential to explode.

Figure 13:
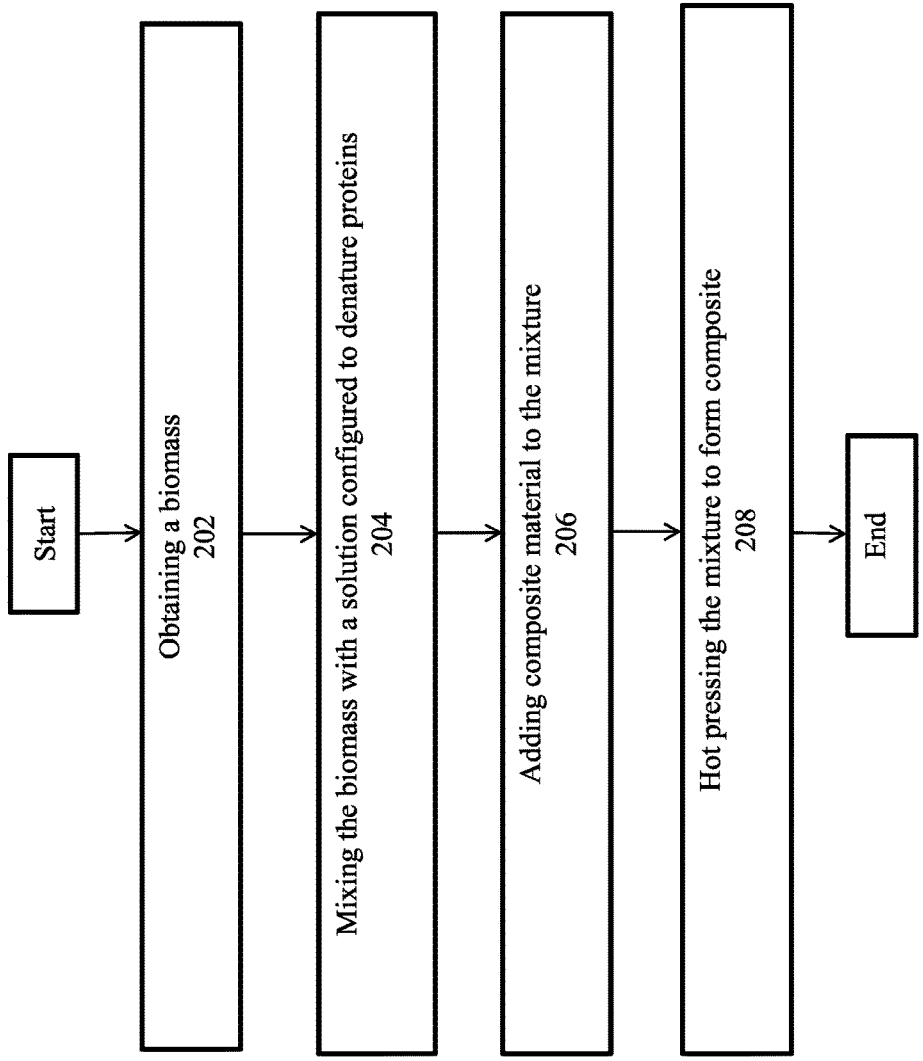
FIG. 13 illustrates an embodiment of a method of creating a composite using an adhesive.
Figure 14:
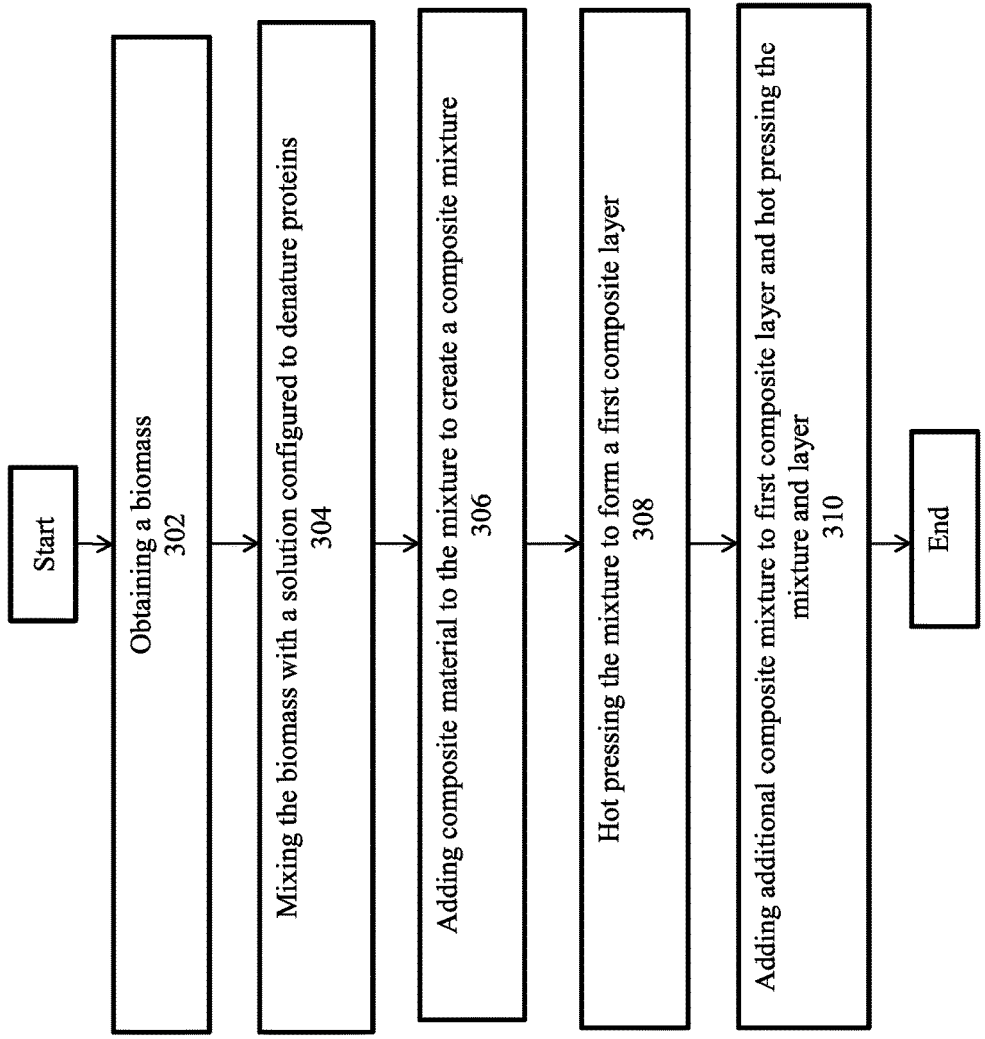
FIG. 14 illustrates an embodiment of a method of creating a composite using an adhesive.
Figure 15:
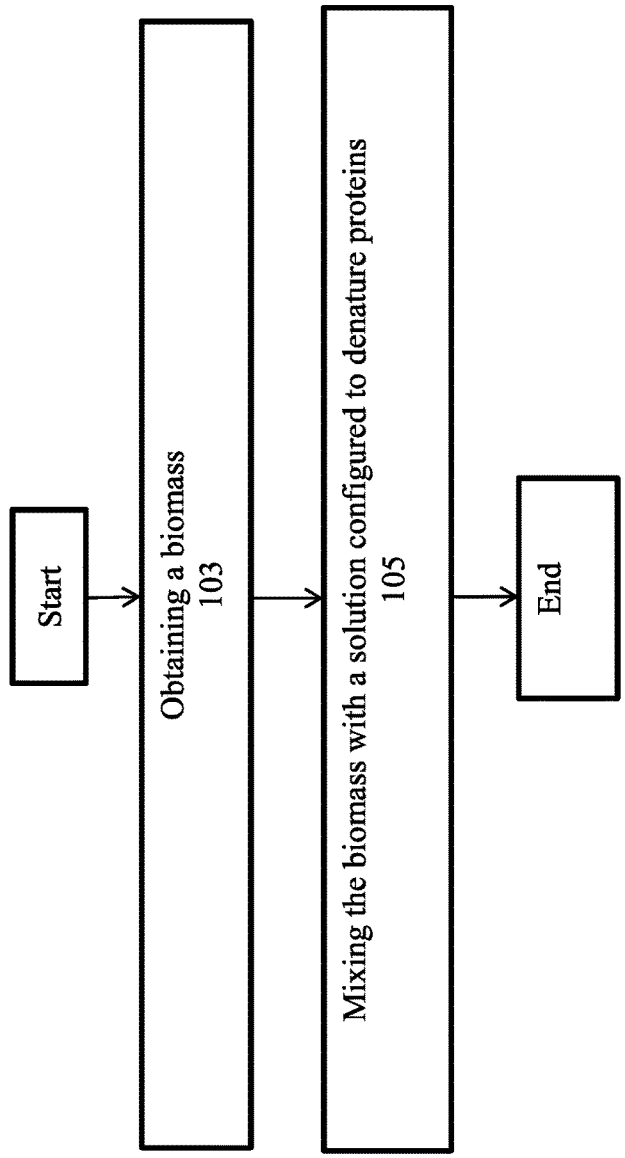
FIG. 15 illustrates an embodiment of a method of creating an adhesive.

Several strategies and methods have been discovered to mitigate this potentially dangerous issue. One method comprises designing composite mixtures with significant porosity to allow for the steam that is created upon heating and pressurization to exit the composite material easily. Another method comprises limiting the amount of water used in the adhesive and/or the composite mixture so that the minimum amount of water required to disperse and denature the protein in the biomass is used. Yet another method comprises limiting the amount of adhesive used in the composite mixture so that the amount of adhesive used is kept low enough so as to not seal off the porosity in the composite. Limiting the amount of adhesive also reduces the amount of water that needs to evaporate. However, even with using a limited amount of adhesive, the method described herein has been used to make particleboard composites that have similar flexural rigidity and strength to conventional particleboards. Another method comprises controlling the amount of composite mixture and the resulting thickness of the composite mixture in the mold. However, limiting the amount of composite mixture and the thickness of the composite mixture in the mold makes it difficult to produce large, thick composites that are completely dried and hardened in a single hot press cycle. One embodiment of the method comprises hot pressing the composite mixture to form a composite, as shown in FIG. 13. A further embodiment of the method comprises compressing individual layers of composite mixture to form a first composite layer, forming a second composite layer using the same method as the formation of the first composite layer, applying an adhesive between the first and second composite layers, then hot pressing the first and second composite layers together to create a composite that is not limited in its thickness by the water evaporation/boiling issue. This method results in a thicker, larger composite than those that could be created by forming the composite in a single hot press cycle. This method comprises using the adhesives with the same chemical composition to both make the composite layers and to adhere the composite layers together. In an alternate embodiment, the method comprises using the adhesive to create the composite layers and using a glue to adhere the composite layers together. In another alternate embodiment, while the adhesive to make the composite layer, the first adhesive, has the same components as the adhesive used to adhere the composite layers together, the second adhesive, the concentrations of the components in first adhesive are different from the concentration of the components in the second adhesive. In still another embodiment, the adhesive used to make the composite layers has different components from the adhesive used to adhere the composite layers together. In an alternate embodiment, an adhesive is placed on the first composite layer and then the second composite layer at least a minimal amount of pressure is applied to push the second composite layer against the adhesive on the first composite layer, but with no hot pressing. In another embodiment, an adhesive is added to the first composite layer and the second composite layer is clamped to the first composite layer, so that the adhesive is located between the first composite layer and the second composite layer. In one embodiment, the clamping pressure is between approximately 80 psi and approximately 120 psi. As shown in FIG. 14, a further alternative method of making a composite comprises hot pressing the composite mixture to form a single layer of composite, then adding additional composite mixture to this layer and performing an additional hot pressing step. In one embodiment, the method comprises subjecting a layer of composite mixture to a hot pressing step to form a layer of composite, then adding another layer of composite mixture and performing another hot pressing step to create an additional layer of composite on the first layer of composite. In another embodiment, the method comprises performing a hot pressing step on a composite mixture to form a first composite layer, adding an additional composite mixture to the first composite layer and then performing another hot pressing step, and repeating the addition of the composite mixture followed by a hot pressing step at least one additional time to form a final composite.

In one embodiment, the hot pressing step is performed for a duration of approximately 8 minutes to compact the composite into a solid specimen.

In some embodiments, the hot pressing of these composites is done at a higher temperature to allow for faster drying up to the point where the surface of the composite burns or discolors. For embodiments wherein the composite material comprises sawdust and bagasse, the temperature for the hot pressing step is approximately 350° F. However, depending on the composite material used, the temperature for the hot pressing step may be different.

In some embodiments, the pressure for the hot pressing step is maximized to improve thermal contact and conductivity, to create a denser composite, and to create better adhesion. However, the pressure can only be increased to a certain point before stress cracks, which are highly detrimental to mechanical and esthetic properties, form in the compressed product. In one embodiment of the method, a clamping pressure of approximately 80 psi to approximately 120 psi is applied during the hot pressing step. However the optimal pressure will vary based on the composite material and adhesive used.

If composites are left unconstrained under ambient conditions for a period of days after the hot pressing step, they may warp significantly. The warping is likely due to the loss of residual water and the relaxation of internal stresses developed in the hot pressing step. Three methods have been found to minimize or eliminate the warping. In one embodiment, the method comprises performing the hot press step for a significantly longer time period than 8 minutes. While this is effective, it is often undesirable due to the increased cycle time. In another embodiment, the method comprises performing the hot press step on the adhesive-composite material mixture to form a composite, clamping the recently hot pressed composite so that they cannot warp, and then heating the clamped composite to approximately 105° C., and maintaining the clamping and the temperature for approximately 20 hours to approximately 48 hours, to eliminate residual water and internal stresses. In yet another embodiment, the method comprises the creation of a multiple-layered composite through the hot pressing of a composite mixture to create a first layer of composite, then the addition of another layer of composite mixture followed by hot pressing the first layer composite and the newly added composite mixture. The multiple layered composite did not exhibit any substantial warping. In one embodiment, the hot pressing step comprises using a press time of longer than approximately 8 minutes followed by clamping the recently hot pressed composite for a period of between approximately 20 hours to approximately 48 hours. In a further embodiment, the hot pressing step comprises using a press time of longer than approximately 8 minutes, clamping the recently hot pressed composite, and heating the clamped recently hot pressed composite to approximately 105° C., and maintaining the temperature and the clamping for a period between approximately 20 hours and approximately 48 hours. In an alternate embodiment, the hot pressing step comprises using a press time of less than approximately 8 minutes. In another embodiment, the method comprises a hot pressing step comprising a press time of less than approximately 8 minutes, followed by a clamping step comprising clamping the recently hot pressed composite for a period between approximately 20 hours to approximately 48 hours. In yet another embodiment, the method comprises a hot pressing step comprising a press time of less than approximately 8 minutes, followed by a clamping step comprising clamping the recently hot pressed composite for a period of 20 hours to 48 hours at a temperature of approximately 105° C. The various embodiments for hot pressing may be used either to make a single composite, a single composite layer, or to create multiple layers of composite. Additionally, the clamping step may be used to make a single composite, a single composite layer, or to create multiple layers of composite.

Older shear strength tests indicated that a maximum shear strength of the adhesive was obtained at a reaction time of approximately 60 minutes. Viscosity is an indicator of the adhesive strength. Recent viscometry experiments suggest that the viscosity of the adhesive mixture formed by the method described herein monotonically decreases after mixing. The recent viscometry experiments indicate for maximum adhesive strength, the adhesive mixture should be mixed with a composite material and hot pressed as soon as possible after complete dispersion and the mixing of the biomass with a strong base.

Examples of specific methods, and compositions and composites created from those methods, are provided below. These examples are illustrative only and are not intended to be limiting.

Example 1

In some embodiments, approximately 1 gram of PEAR may be mixed with a denaturant; the denaturant comprising approximately 30 mL of approximately 0.1M NaOH. The resulting PEAR-denaturant mixture may be treated at a temperature condition of approximately 50° C. for a treatment time of approximately one hour.

Example 2

In some embodiments, approximately 1 gram of PEAR may be mixed with a denaturant; the denaturant comprising approximately 30 mL of approximately 0.1 M NaOH. The resulting PEAR-denaturant mixture may be treated at a temperature condition of approximately 50° C. for a treatment time of approximately one hour. In an additional step, the PEAR-denaturant mixture is centrifuged to remove insoluble solids.

Example 3

In some embodiments, approximately 3 grams of PEAR may be mixed with a denaturant; the denaturant comprising approximately 30 mL of approximately 3M urea. The resulting PEAR-denaturant mixture may be treated at a temperature condition of approximately 50° C. for a treatment time of approximately two hours. In an additional step, the PEAR-denaturant mixture is filtered to remove insoluble solids. Although any suitable filter may be used for this filtering step, one non-limiting example of a filter that may be used is a simple coarse paper filter.

Additional steps may be performed to configure the PEAR-denaturant mixture for use as an adhesive on a particular substrate. Examples of substrates include, but are not limited to, paper, label, or other items that the user wishes to adhere together. For example, in one embodiment, the method comprises applying the PEAR-denaturant mixture a surface of a first substrate unit (e.g., one piece of paper or one side of a label). In some embodiments, a second substrate unit is placed adjacent to the PEAR-denaturant mixture that was applied to the first substrate unit, such that the PEAR-denaturant mixture is sandwiched between the first substrate unit and the second substrate unit. Optionally, the first substrate unit, the second substrate unit, and the PEAR-denaturant mixture (collectively with the first substrate unit and the second substrate unit, a "multiple substrate unit") may be clamped together or to a support component (e.g., a shelf, rack, board, etc.) using at least one clamping instrument.

The multiple substrate unit may be permitted to dry. In some embodiments, the drying process may constitute merely positioning the multiple substrate unit on a support unit, either with or without using a clamping instrument), and then not altering the position of the multiple substrate unit for a period of time. In some embodiments, the drying process may be accelerated by positioning the multiple substrate unit in a heating element, such as a laboratory oven, industrial oven, or any other unit that is configured to emit heat, whether currently known or developed in the future. In one embodiment, the drying process may include a drying temperature of approximately 105° C. for a drying time of approximately 24 hours. In some embodiments, the method comprises providing a mixture having a tensile strength that is sufficient to permit casual handling of the multiple substrate unit without resulting in the separation of the first substrate unit from the second substrate unit.

Example 5

In some embodiments, approximately 15 grams of PEAR may be mixed with a denaturant; the denaturant comprising approximately 225 mL of approximately 1M NaOH. The PEAR-denaturant mixture may be treated at a temperature condition of approximately 50° C. for a treatment time of approximately 1 hour.

Example 6

In some embodiments, approximately 15 grams of PEAR may be mixed with a denaturant; the denaturant comprising approximately 225 mL of approximately 1 M NaOH. The PEAR-denaturant mixture may be treated at a temperature condition of approximately 50° C. for a treatment time of approximately one hour. Subsequently, the resulting mixture may be merged with approximately 300 grams of wood product, to obtain a mixture-wood product composite. In one embodiment, the wood product comprises approximately 70% core furnish (coarse wood particles) and approximately 30% face furnish.

In some embodiments, the mixture-wood product may require pressing. The mixture-wood product composite may be pressed at a pressing temperature of approximately 450° F. for a pressing time of approximately 2 minutes to approximately 6 minutes, or until cessation of audible boiling. The pressure applied in the pressing step may range from between approximately 1300 pounds and approximately 2000 pounds over an approximately 5"×5" plate. Generally, a higher pressure in the approximately 1300 pound to approximately 2000 pound range is configured to yield more dense and more rigid composites, while lower pressures within the range are configured to yield less dense and less rigid composites. In one embodiment, the press may be de-pressured slowly to manage the release of steam.

Various combinations of the steps illustrated in FIG. 1 through FIG. 6 and FIGS. 11 and 12 may be conducted to produce an adhesive. Alternative additional embodiments of the method that comprise a combination of steps are illustrated in FIG. 7 through FIG. 10 and FIGS. 13 and 14.

Figure 7:
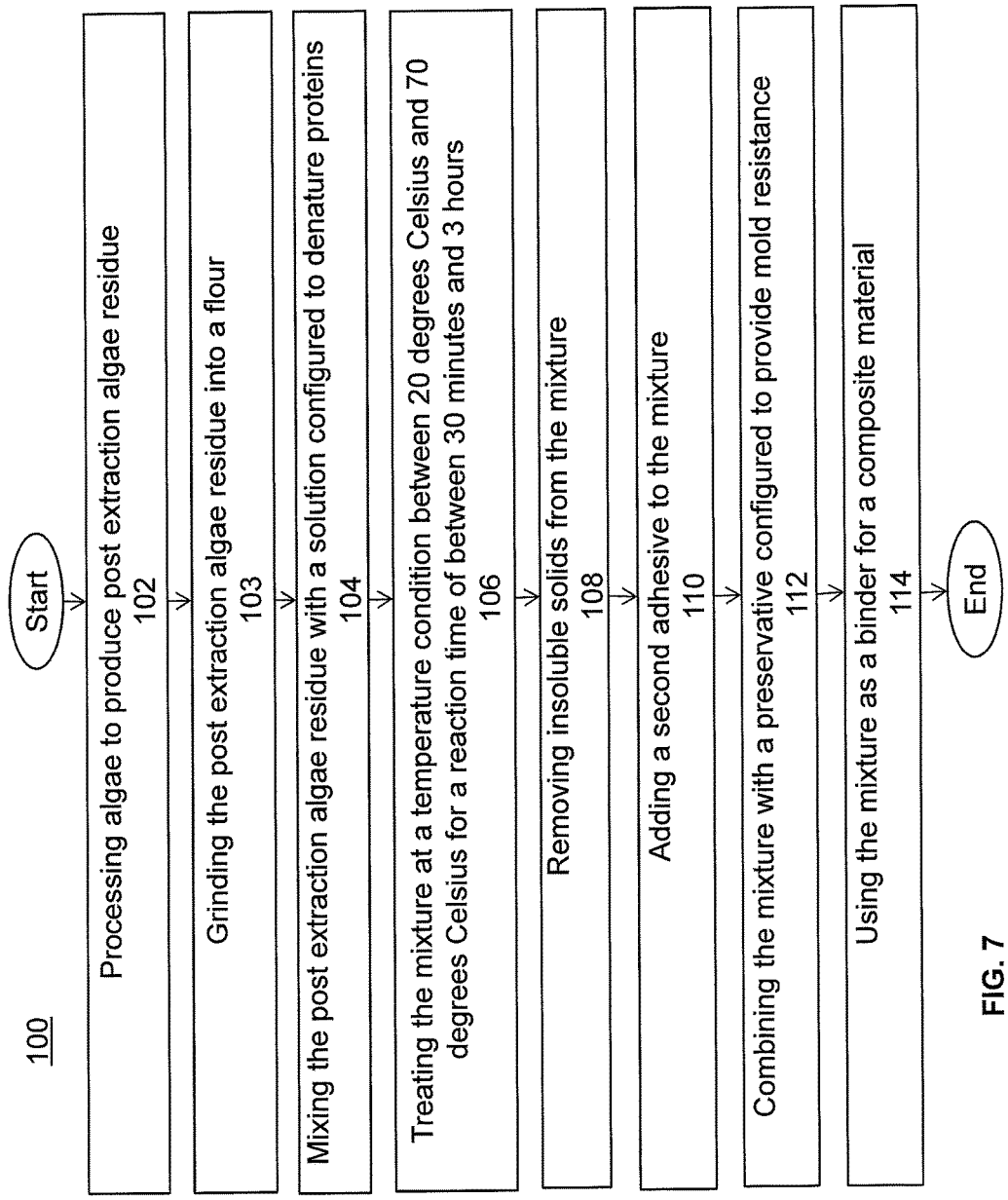
FIG. 7 illustrates an embodiment of a method of creating and using an adhesive.

FIG. 7 illustrates another embodiment of the method. In FIG. 7, the method comprises a purification step and an enrichment step to produce the PEAR that may be used to form an adhesive.

Figure 8:
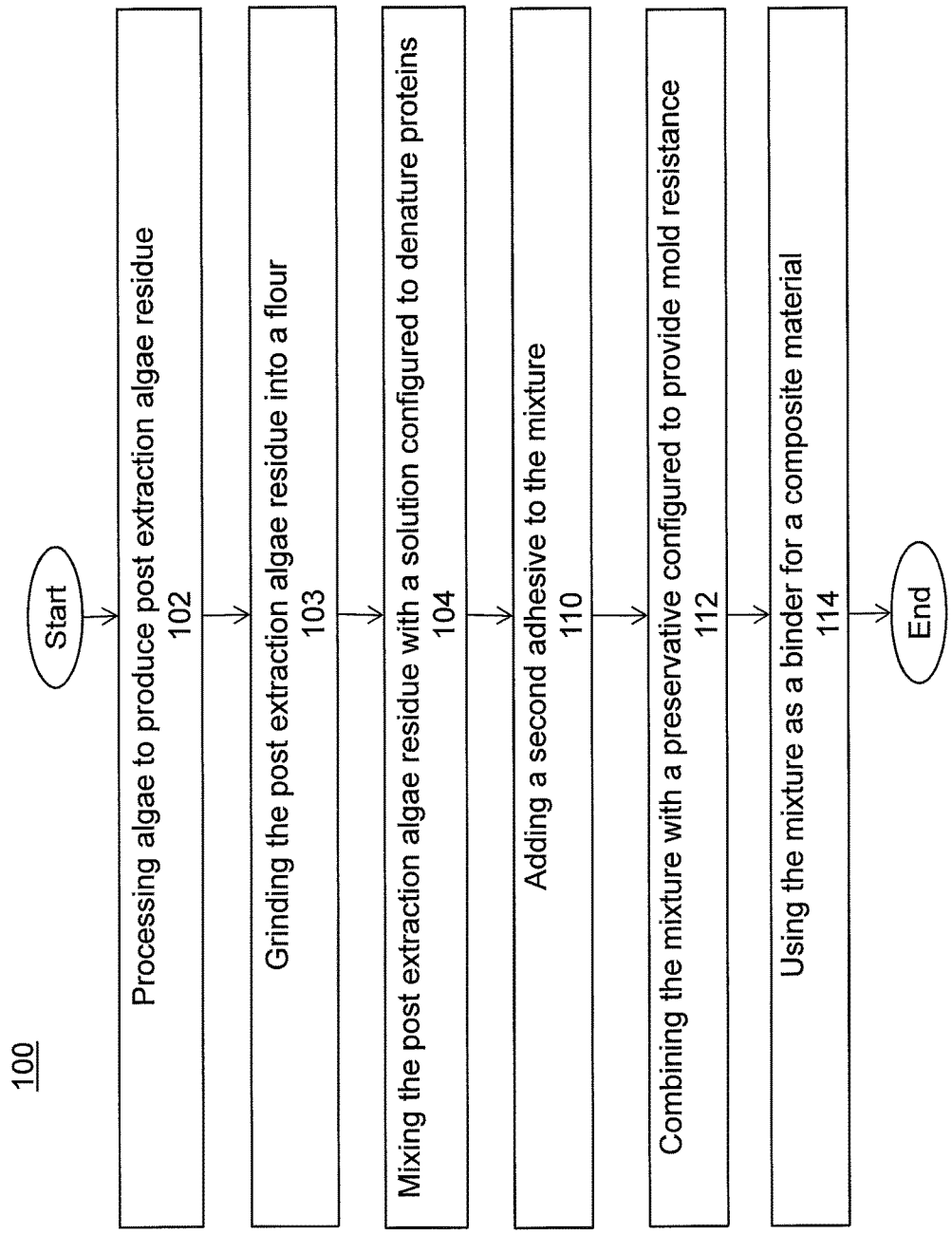
FIG. 8 illustrates an embodiment of a method of creating and using an adhesive.

FIG. 8 illustrates an additional embodiment of the method. In FIG. 8, the purification step is not necessary to produce the PEAR that may be used to form an adhesive.

Figure 9:
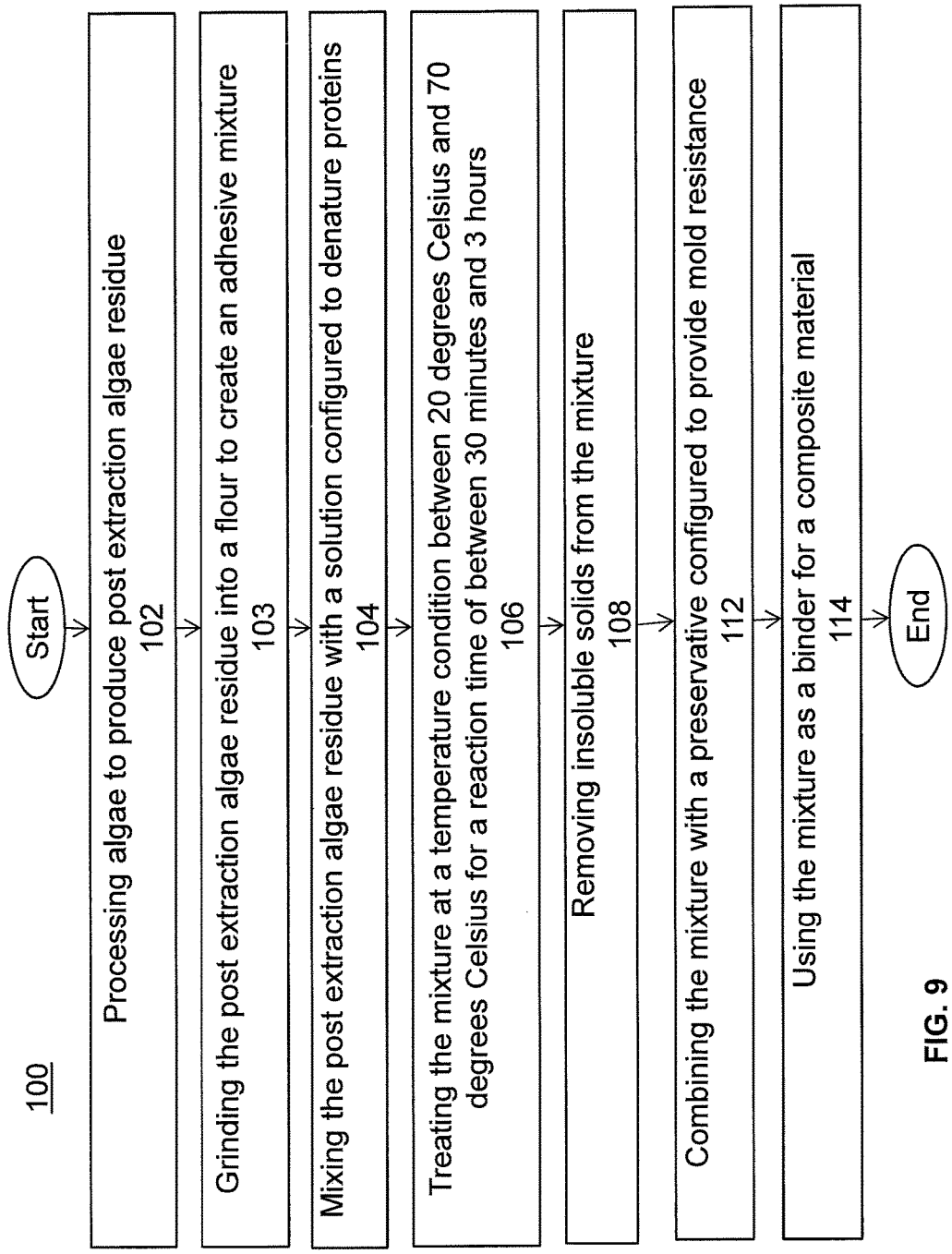
FIG. 9 illustrates an embodiment of a method of creating and using an adhesive.

FIG. 9 illustrates an additional embodiment of the method. In FIG. 9, the enrichment step is not necessary to produce the PEAR that may be used to form an adhesive.

Figure 10:
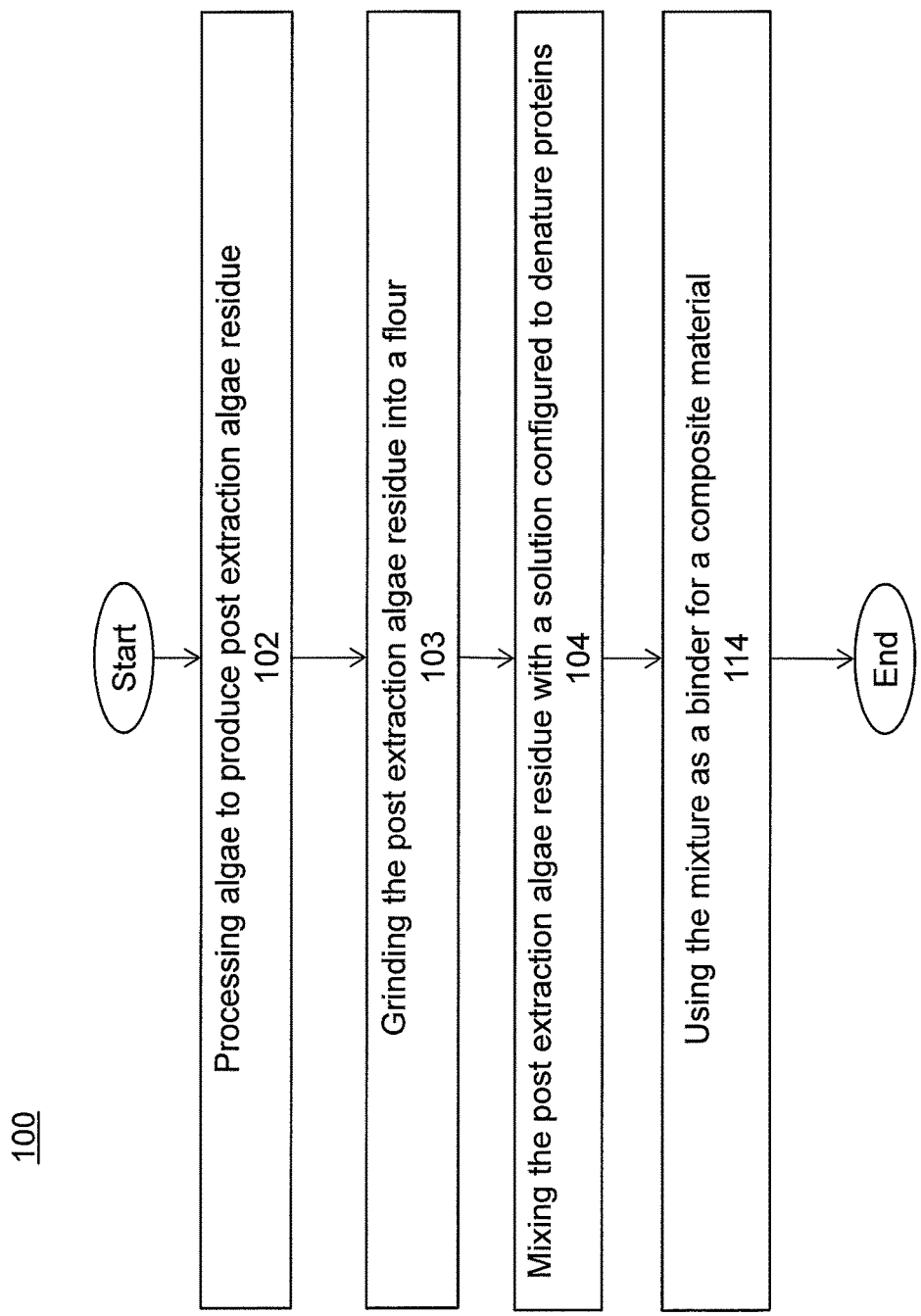
FIG. 10 illustrates an embodiment of a method of creating and using an adhesive.

FIG. 10 illustrates another embodiment of the method. In FIG. 10, neither a purification step nor an enrichment step is necessary to produce the PEAR that may be used to form an adhesive.

In addition, in some embodiments of the method, the method comprises adhesives generated by any of the embodiments of the methods, or combinations of the methods, described herein.

For the purpose of understanding the method for treatment of biomass products or residues and resulting compositions, references are made in the text to exemplary embodiments of a method, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the method for treatment of biomass products or residues and resulting compositions may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A method for producing an adhesive from biomass products or residues, comprising the steps of:
   a. obtaining a biomass comprising wastewater treatment biosolids;
   b. extracting a component from said biomass, thereby generating a byproduct of said biomass;
   c. grinding said byproduct of said biomass into a ground biomass byproduct;
   d. wetting said ground biomass byproduct, creating a ground wetted biomass byproduct; and
   e. combining said ground wetted biomass product with a solution, said solution configured to denature proteins in said ground wetted ground biomass product, creating a ground wetted biomass byproduct-solution mixture; and
   f. mixing said byproduct-solution mixture to form an adhesive mixture.

2. The method of claim 1, wherein the step of combining said ground wetted biomass product with a solution occurs at a temperature condition between approximately 20° C. and approximately 70° C. for a reaction time of between approximately 1 seconds and approximately 3 hours.

3. The method of claim 1, wherein said combining step further comprises altering a level of denaturation of proteins in said ground wetted biomass byproduct-solution mixture by adjusting changing at least one of: a temperature condition, a treatment time, and concentration of constituents of the solution.

4. The method of claim 1, further comprising a step of adding a preservative to said by-product-solution mixture before said mixing.

5. The method of claim 1, further comprising a step of adding crosslinkers to said by-product-solution mixture before said mixing.

* * * * *